Patented Nov. 2, 1943

2,333,242

UNITED STATES PATENT OFFICE 2,333,242

WATER MASTICATION OF SYNTHETIC RUBBER

Charles F. Fryling, Silver Lake, Ohio, assignor to The B. F. Goodrich Company, New York, N. Y., a corporation of New York No Drawing. Application March 5, 1940, Serial No. 322,379

4 Claims. (Cl. 260—84.5)

This invention is concerned with the problem of increasing the plasticity of synthetic rubber-like materials and is particularly related to a process of masticating synthetic rubber in the presence of water.

Before synthetic rubber of the butadiene-1,3 acrylic nitrile copolymer type, such as the rubbery copolymers of butadiene-1,3 and lesser amounts of acrylonitrile or methacrylonitrile, can be processed efficiently in the factory, it is desirable to have the synthetic rubber in a plastic condition. This is necessary in order to secure proper dispersion of pigments in the synthetic rubber and also to facilitate shaping and moulding of the compounded synthetic rubber prior to vulcanization. It is well known that the usual method of rendering either synthetic or natural rubber more plastic is by a mechanical working such as is obtained on a rubber mill. Moreover, it is believed that the breakdown so effected is the result of oxidative processes, and that the rate of oxidation is accelerated by the mechanical strains produced during milling or by oxygen activated by electrostatic charges.

There are, however, fundamental differences in the behaviour of natural rubber and butadiene-1,3 acrylic nitrile copolymers when being milled because, presumably, of their differences in internal structure. The copolymers are more liable to undergo self-hardening resulting from interlinking or cyclization of the polymer chains and are not broken down so quickly and completely when milled as is natural rubber. Natural rubber becomes very soft and plastic when worked for a sufficient length of time while the same amount of working does not bring about this condition with butadiene acrylonitrile copolymers. Moreover, such copolymers are incapable of satisfactory mastication on a hot mill since they become hard, dry, and finally crumble and fall from the mill altogether. Even if a cold mill is employed initially the heat generated by the mechanical working is often sufficient to have a disastrous effect on the milling properties of the copolymer. As a result of these difficulties it has been necessary to employ relatively large amounts of softeners such as oils, tars, waxes and the like in order to obtain the copolymer in the desired state of plasticity. This procedure is not desirable, however, because the strength of vulcanized products is invariably weakened by the presence of such softeners.

The present invention provides a process whereby the aforementioned impracticabilities may principally be avoided and butadiene-1,3 acrylonitrile copolymers may be rendered more plastic without harming the physical properties of vulcanizates obtained from them. By means of the process of the present invention it is also possible to obtain copolymers in which pigments are more easily dispersed and which yield vulcanized products of superior elongation. In brief, this process consists in subjecting rubbery butadiene-1,3 acrylonitrile copolymers or similar synthetic rubber-like materials to a preliminary mastication in the presence of water before working and compounding on a dry mixing mill. The method of carrying out the process and the benefits derived therefrom will be apparent from the following description of this invention.

The production of synthetic rubber of the butadiene-1,3 acrylic nitrile copolymer type involves a process of polymerization which may be carried out either in a homogeneous system, as, for example, the polymerization of a liquid mixture of butadiene and acrylonitrile dissolved in a common solvent, or in a heterogenous system, as for example, the copolymerization of an aqueous emulsion containing butadiene, acrylonitrile, emulsifying agent, and polymerization catalyst. Regardless of the method by which the polymer is produced, said polymer is eventually obtained as a tough resilient massive body which must be plasticized before further use. If, for example, the polymer is obtained by emulsion polymerization, the synthetic latex must be coagulated and the coagulum separated by some convenient means such as filtration before the polymer is available in solid massive form. It has previously been the practice to subject the solid polymer to plasticization on a mill or in an internal mixer at some time following polymerization as the next step in processing operations.

According to this invention however the solid polymer, regardless of how produced, is subjected to a preliminary mastication in the presence of water as the step following polymerization. In case the polymer has been produced in emulsion, this treatment will conveniently follow the coagulation without any intermittent drying process. The water mastication may take place in any suitable manner and in any suitable apparatus, the essential feature of the process being that there is a steady stream of water passing over the synthetic rubber throughout the mastication. The heat generated by the breakdown of the rubber is, in this way, continuously taken up by the water and dissipated, so that the polymer may be worked at temperatures which are not injurious to its properties.

Conventional rubber processing machinery may be used to carry out the water mastication process. For example, the copolymer may be masticated in an internal mixer such as the Farrel internal washer which is similar to a Banbury mixer except that means for introducing and applying water is provided. Then too, the mastication may take place on either a two roll or a four roll washer such as is in common use in rubber factories. A practical manner in which to carry out the process is by the use of a two roll machine such as is used in washing certain grades of crude rubber. This machine is similar to the ordinary mixing mill except that the surface of the wash rolls is corrugated, although this feature is not essential for the present purpose. A perforated pipe is mounted above and parallel to the rolls to deliver water continuously during the mastication. A pool of water is formed through which the polymer passes. Several gallons of water per minute may be used in ordinary practice. Although the water need not be at any specified temperature, it follows that the colder it is the better for the purpose. Convenient temperatures are, for example, from 0° to 50° C. As shown hereinafter, the treatment may be continued for various periods of time dependent upon the degree of plasticity desired in the polymer. Treatments continued for only 5 minutes have been found to have a noticeable effect but, in general, 10 to 60 minute treatments are to be recommended.

After the copolymer has been subjected to this water masticating process it may be dried in any convenient manner such as by sheeting the material and air drying or vacuum drying, preferably the latter. The dried polymer may then be mixed with pigments on an ordinary mixing mill and subjected to the usual processing and vulcanizing.

In order to show more specifically the desirable effects of the water mastication process of the present invention on the properties of the copolymers and the vulcanized materials obtained therefrom the following example is cited but it is not intended that the invention be limited thereto.

*Example.*—A copolymer prepared by the emulsion polymerization of 75 parts of butadiene and 25 parts of acrylonitrile was masticated on an experimental two roll wash mill of the type previously described for varying lengths of time as hereinafter shown. The polymer crumbs were first passed through the rollers to knit them together. A vigorous spray of water was then turned onto the polymer as it was passed through the mill. As the polymer was being torn down by the masticating action of the rollers considerable heat was generated and, at first, the polymer came through the mill hot even though water was drenching it. As mastication proceeded, however, the nerve of the polymer was broken down and the temperature of the synthetic rubber dropped. The water falling from the synthetic rubber was perceptibly warmer than before it bathed the rubber. After the material had been masticated for the required length of time it was dried in a vacuum drier at about 70° C. and plasticity measurements on the Goodrich plastometer were taken on portions of the material. Other portions of the masticated polymer were compounded in the following test recipe:

| | Parts |
|---|---|
| Butadiene-acrylonitrile copolymer | 100 |
| Channel black | 50 |
| Zinc oxide | 5 |
| Pine tar | 3.5 |
| Lauric acid | 1.5 |
| Phenyl beta-naphthylamine | 1.0 |
| 2-mercapto 4,5-dimethylthiazole | 1.25 |
| Sulfur | 1.25 |

The compounded stocks were then vulcanized and the tensile properties of the vulcanizates were determined in the usual manner.

In order to compare water mastication with ordinary milling, control samples of the copolymer were milled without water and their properties as well as those of their vulcanizates were also measured. It should be mentioned that the mastication without water took place on a small experimental mill which could be kept considerably cooler than a larger mill such as would be necessary to use in factory production. This means that the beneficial effects of this treatment when applied in the factory would be even more noticeable than is indicated by the following tabulated results.

*Table*

| | Water mastication, minutes | | | | Standard milling, minutes | |
|---|---|---|---|---|---|---|
| | 5 | 10 | 30 | 60 | 10 | 60 |
| Plasticity at 30° C | 4.5 | 4.7 | 6.0 | 9.0 | 4.2 | 7.0 |
| Plasticity at 100° C | 16.0 | 25.0 | 32.0 | 60.0 | 13.5 | 36.0 |
| Elongations 20' cure @ 310° F | 680 | 700 | 710 | 715 | 510 | 630 |
| 30' cure @ 310° F | 650 | 600 | 660 | 680 | 460 | 590 |
| 45' cure @ 310° F | 600 | 620 | 620 | 620 | 430 | 500 |

From the tabulated results it can be seen that approximately the same degree of plasticity can be produced in half the milling time by carrying out the mastication in the presence of water. Moreover a degree of plasticity can be attained by continued milling with water which could not be attained by standard milling. This effect is particularly pronounced when plasticity is measured at 100° C. and significantly shows that polymers subjected to water mastication are not liable to a self-hardening at higher temperatures as are the polymers masticated in the ordinary way. The water mastication also produces another very favorable effect in that the ultimate elongations of vulcanized products from water masticated stocks are much greater than those from stocks milled for longer periods without water. Tensile strengths of the vulcanizates also tend to be higher.

Improved plasticities and elongations have also been obtained by water masticating using a copolymer of butadiene and methyl methacrylate and a triple-polymer containing butadiene, acrylonitrile and styrene. The effect in the latter case is particularly pronounced, elongations of up to 1100% having been shown by vulcanizates containing this polymer.

The water mastication process of the present invention not only provides a method whereby synthetic rubber-like materials may be processed with greater ease and whereby rubber-like vulcanized products of superior properties may be obtained, but also this process is of value economically since a saving in the power and time necessary to masticate synthetic rubber is thereby effected.

It is not intended, therefore, that this invention be limited to the specific examples herein provided; for the process may be modified without departing from the spirit and scope of the appended claims.

I claim:

1. In the processing of a rubbery copolymer of butadiene-1,3 and a lesser amount of an acrylic nitrile, the steps which comprise subjecting said copolymer to masticating conditions in the presence of a continuous liquid stream of cold water, continuing the mastication for a time sufficient materially to increase the plasticity of said copolymer, terminating the mastication and sheeting and drying the copolymer.

2. In the processing of a rubbery copolymer of butadiene-1,3 and a lesser amount of acrylonitrile, the steps which comprise masticating said copolymer on unheated rollers, flowing a continuous liquid stream of cold water over said copolymer as it is passed through the rollers, continuing the masticating and the flowing of the water for a time sufficient materially to increase the plasticity of said copolymer, removing the wet copolymer from the rollers in the form of sheets and drying the sheets.

3. In the processing of a rubbery copolymer of butadiene-1,3 and a lesser amount of acrylonitrile, the steps which comprise masticating said copolymer on unheated rollers and in the presence of a continuous liquid stream of cold water for about 10 to 60 minutes, removing the wet copolymer from the rollers in the form of sheets and drying the sheets in a vacuum.

4. As a new product a plastic rubbery copolymer of butadiene-1,3 and acrylonitrile, said copolymer having been masticated in the presence of a continuous liquid stream of cold water, sheeted while wet and dried.

CHARLES F. FRYLING.